(12) United States Patent
Ciulis

(10) Patent No.: US 6,416,066 B1
(45) Date of Patent: Jul. 9, 2002

(54) CANOE CADDY

(76) Inventor: Michael Ciulis, 302 Tapawingo Rd., SW., Vienna, VA (US) 22180

( * ) Notice: Subject to any disclaimer, the term of this patent is extended or adjusted under 35 U.S.C. 154(b) by 0 days.

(21) Appl. No.: 09/897,916

(22) Filed: Jul. 5, 2001

(51) Int. Cl.$^7$ ................................................ B62B 1/04
(52) U.S. Cl. ........................ 280/47.331; 280/444.2
(58) Field of Search ................... 280/47.331, 414.1, 280/414.2, 39, 40, 35, 651, 652; 114/344

(56) References Cited

U.S. PATENT DOCUMENTS

| | | | | | |
|---|---|---|---|---|---|
| 2,818,268 A | * | 12/1957 | Johnson | ................. | 280/47.331 |
| 4,440,409 A | * | 4/1984 | Margison | ................. | 280/47.331 |
| 4,601,481 A | * | 7/1986 | Maurice | ................. | 280/47.331 |
| 4,712,803 A | * | 12/1987 | Garcia | ................. | 280/47.331 |
| RE32,844 E | | 1/1989 | Horowitz | ................. | 280/641 |
| 4,824,127 A | | 4/1989 | Stamm | ................. | 280/47.331 |
| 5,203,580 A | | 4/1993 | Cunningham | ........ | 280/47.331 |

* cited by examiner

*Primary Examiner*—Michael Mar
(74) *Attorney, Agent, or Firm*—Patent & Trademark Service; Thomas Zack; Joseph H. McGlynn

(57) ABSTRACT

A vessel transporter device which permits the vessel to be held to a scissor-like frame by engaging members which bear against the gunwales of the vessel.

2 Claims, 2 Drawing Sheets

CANOE CADDY

BACKGROUND OF THE INVENTION

This invention relates in general to a vessel transporting device and in particular to a vessel transporting device for canoes with arms to secure the canoe to the device.

When it was desired to transport small vessels, like canoes, over land portage was initially employed. To save labor and time, transporter devices which permitted the vessel to be moved over the land were developed. The transporters used both rolling members, usually wheels, and a frame to secure the canoe. Straps or other holding mechanisms were used to keep the vessel on the frame. Once secured in place the frame was rolled over the land. When it was desired to place the vessel in water, the holding mechanisms were released from the vessel and the vessel removed from the frame.

To move the vessel once it is secured to the frame, one end is usually elevated with the weight being placed on the rolling members. In some cases more than two pairs of wheels are used on the frame. While such devices are generally satisfactory for the intended purpose, it takes considerable time to fix the holding mechanism around the vessel initially, and time to undue the holding mechanisms when the vessel is released. In addition, there is the possibility that the straps or other vessel holding devices will become loose in transit necessitating corrective action. To remedy these defects a vessel transporter has been developed that uses no straps or clamps fixed to a frame and the vessel. Only the weight of the vessel bearing down on the frame structure retains gunwale engaging members in place to hold the vessel to the frame.

DESCRIPTION OF THE PRIOR ART

Devices have been used in the prior art to hold and transport vessels, especially canoes. For example, U.S. Pat. No. 4,440,409 to Margison discloses a canoe caddy with a single wheel mounted to a V-shaped frame which accepts the canoe.

U.S. Pat. No. Re 32,844 to Horowitz discloses a canoe caddy having wheels on one end and straps on the other end to secure a canoe.

U.S. Pat. No. 4,824,127 to Stamm discloses a canoe caddy which has wheels on one end and straps on the other end to secure a canoe and handles which can be attached to the canoe by additional straps.

U.S. Pat. No. 5,203,580 to Cunningham discloses a canoe caddy which has wheels on one end and straps on the other end which pass over the top of the canoe.

The present invention is directed to a vessel transporter device which permits the vessel to be held in a scissor-like frame by engaging members which bear against the gunwales of the vessel, all as will be detailed in the specification that follows hereafter.

SUMMARY OF THE INVENTION

This invention relates to a vessel transporter device which permits the vessel to be held in a scissor-like frame by engaging members which bear against the gunwales of the vessel.

It is the primary object of the present invention to provide for an improved vessel transport device.

Another object is to provide for such a device in which a scissor-like frame has end engaging members which bear against the gunwales of the vessel.

Another object is to provide for such a device in which additional straps are unnecessary to secure the vessel to the transporter device.

These and other objects and advantages of the present invention will become apparent to readers from a consideration of the ensuing description and the accompanying drawings.

DESCRIPTION OF THE PREFERRED EMBODIMENT

Figure 1:
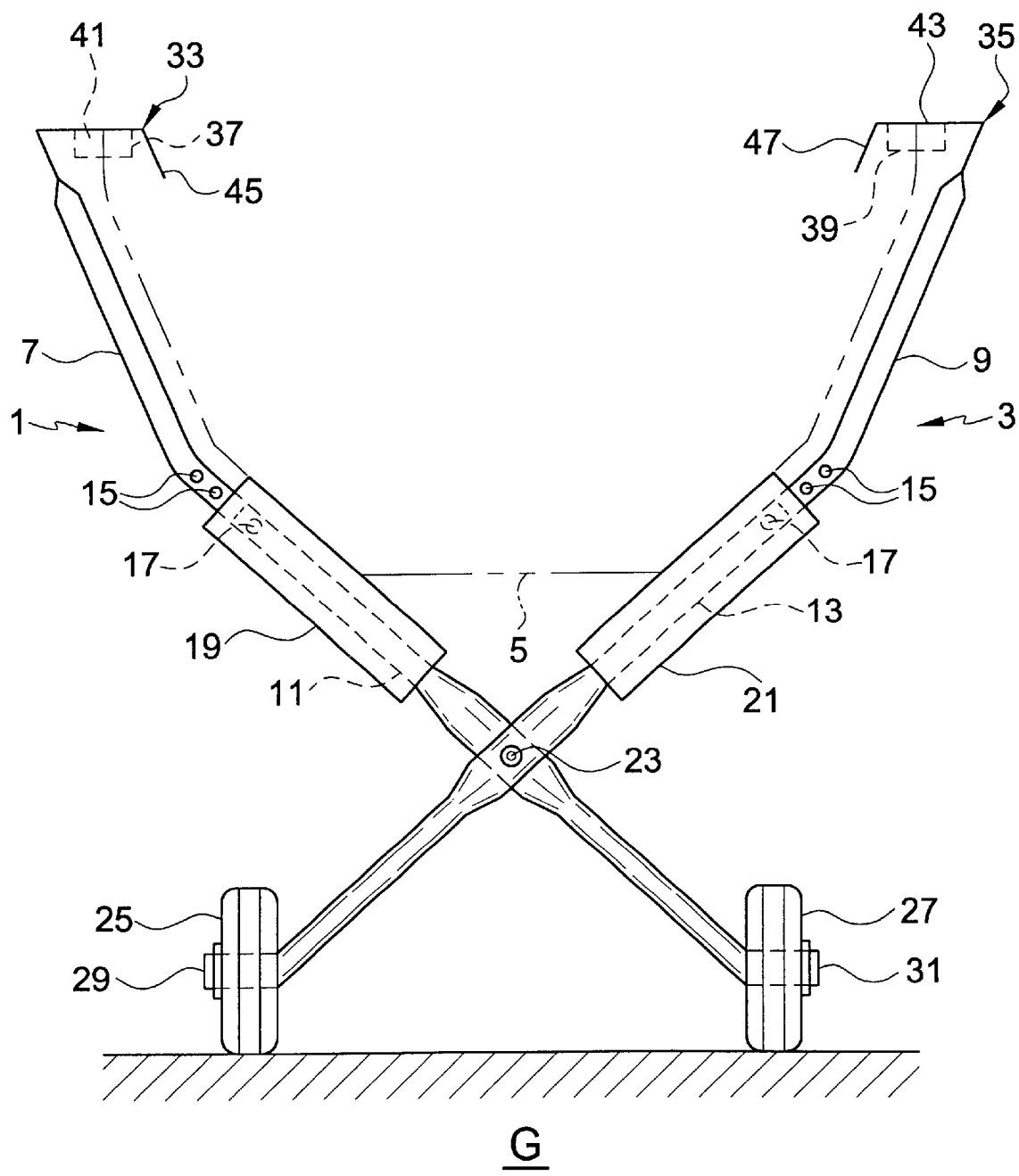
FIG. 1 is a front view of the present invention showing the scissor-like frame members extending to both sides of a canoe.

FIG. 1 is a front view of the present invention showing the scissor-like frame members 1 and 3 extending to both sides of a canoe 5, shown in dotted line format. Each frame member 1, 3 is tubular shaped and substantially identical. Frame members 1, 3 each have two sections. The upper sections 7 and 9 are telescopingly fitted into the lower sections 11 and 13, respectively. To provide for adjustment in the length of the upper and lower frame member sections, there are spaced holes 15 along the upper sections 7, 9 . As best shown in FIGS. 3(a)–3(b), a spring biased button 17 in each lower frame section 11, 13 has a protruding portion which fits into one of the holes 15 in the upper frame member to retain the upper and lower sections in place relative to each other. In FIG. 1, the buttons 17 are shown in dotted line format since they are covered by the movable sleeves 19 and 21.

Sleeves 19, 21 are tubular to extend around the lower sections 11, 13. The sleeves are made of a dense foam material to protect the canoe 5 when it is placed in the transporter device. By making the diameter of the lower sections 11, 13 greater than the diameter of a center hole in the sleeves 19, 21, the sleeves are prevented from falling down the lower sections. To adjust the length of frame sections, the sleeves 19, 21 are moved up to uncover the buttons 17. Then the buttons 17 are depressed which allows the upper and lower sections to be moved in the desired position. This action allows for the adjustment of the length of the sections 7,11 and 9, 13, respectively.

Joining the two frame members 1, 3 is a bolt 23. Bolt 23 allows for pivotal motion between the frame members. A wing nut fastener (not shown) or a knob could be threaded onto one end of the bolt 23 to retain the bolt in place and make it easier for the user to adjust how tightly the frame members are secured. Two wheels 25 and 27 are fixed to the lower ends of frame members 1, 3 . Each wheel is secured to the frame members 1, 3 by a shaft 29, 31, respectively. The surface G represents the supporting surface on which the canoe transporter is to be move over.

At the upper end of each frame member 1, 3 is a generally U-shaped extension 33, 35, respectively. Each extension 33, 35 may be vinyl coated to protect the canoe and extends horizontally and downwardly. The extensions 33, 35 engage three sides of the upper gunwales 37 and 39 of the canoe 5. The extensions 33, 35 have intermediate sections 41, 43 which are connected to two downwardly extending sections 45, 47. The two downwardly extending sections 45 and 47 of each extension 33, 35, respectively, bear against adjacent inner surfaces of gunwales 37 and 39. This capping type of engagement with the gunwales prevents frames 1, 3 from becoming dislodged from the gunwales as the weight of the canoe attempts to spread the upper ends of frame members 1, 3 apart.

Figure 2:
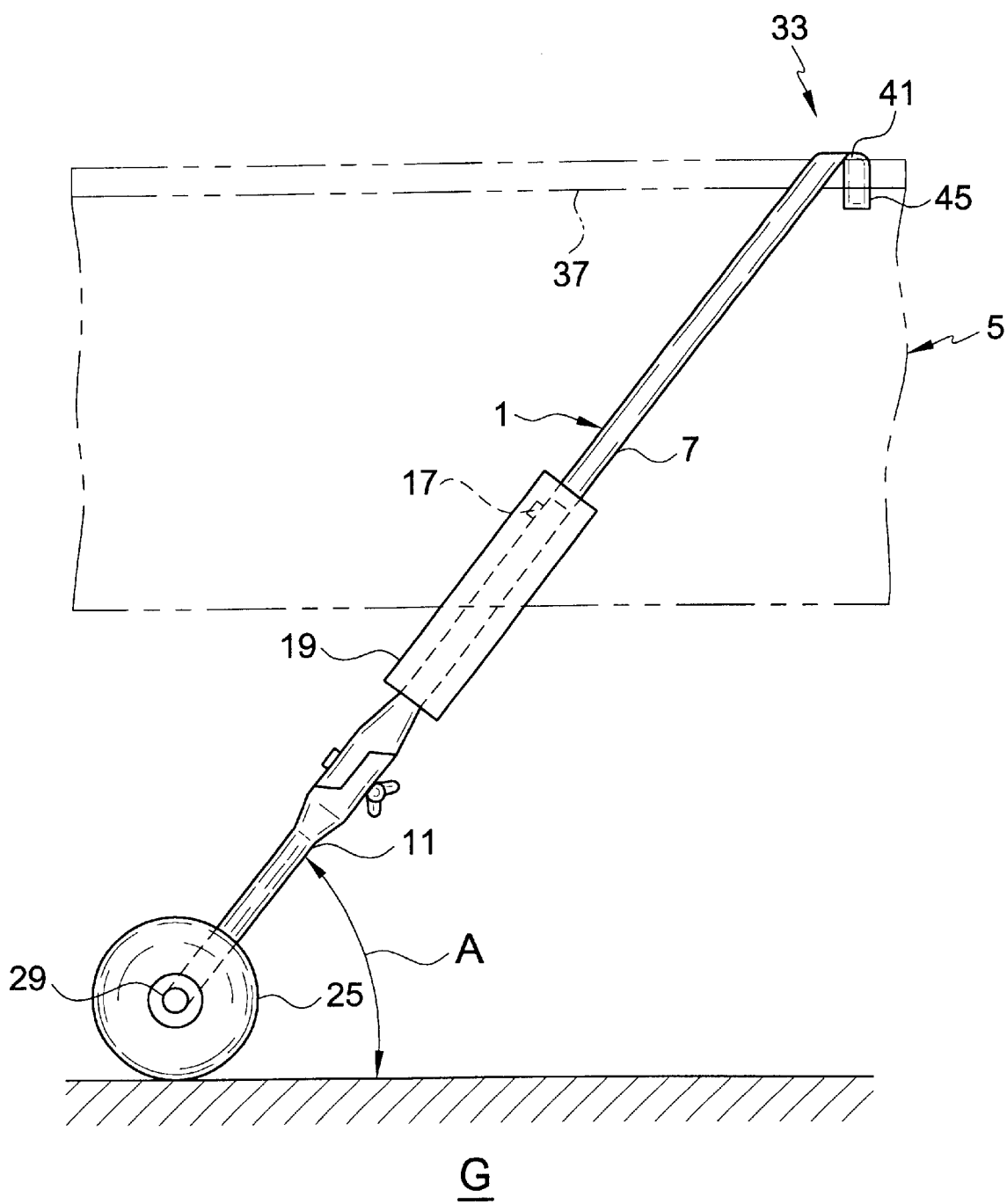
FIG. 2 is a side view of the invention shown in FIG. 1 with a frame member tilted to an engaging position.

FIG. 2 is a side view of the invention shown in FIG. 1. In FIG. 2, the frame member 1 is tilted to engage the hull of the canoe. The other frame member 3, not shown, is on the far side of the canoe 5. Part of canoe 5 is shown in dotted line format. Both tilted frame members 1,3 would be parallel to each other with about the same angle of tilt A relative to the ground G. Typically, angle A is about 55 degrees, however, other angles can be employed without departing from the scope of the invention.

The two sleeves 19, 21, only one of which is shown, are made of a soft foam material. Each sleeve bears against the a side of canoe 5 to cradle and protect the canoe during transport. Extension 33 fit over and cradle three portions of gunwale 37. The downward extension 45 bears against the adjacent inner gunwale surface. The opposite and parallel extension surface to side 45 bears against the outside of the hull. The upper connecting extension 41 bears on the top gunwale surface. Wheel 25 is mounted by shaft 29 to frame section 11.

In use, a user would lift one side of the canoe 5, the right side as shown in FIG. 2, placing the weight of the canoe between the two frame members 1, 3. Because the frame members are pivotally connected together at pivot point 23 (see FIG. 1) the upper ends of frame members 1, 3 would normally spread apart. However, the two extension portions 45, 47, which bear against the inside of the gunwales 37, 39 limit the spreading of frame members 1, 3. Thus, the extensions 33, 35, 41, 43, 45, 47 act as limiting members for the frames members 1, 3. Because the frame members 1, 3 are prevented from spreading apart, as explained above, the canoe will be held securely in the canoe caddy without the use of any additional restraining straps. This will make securing the canoe in the transported a quick and easy operation, even for a single person. Also, the canoe will be securely held during transport even over rough ground.

Clearly other variations may also be made to the present invention. The lengths of extension sections 41 and 43 as well as extension sections 45 and 47 could be made adjustable to accommodate vessels with different gunwale sizes, like row boats, sailing crafts, etc. If the vessel to be moved was very long, two or more in tandem frames such as shown in FIGS. 1 and 2 could be spaced along the length of the vessel. The end of the vessel without the supporting frames of the present invention, would normally be manually raised by a user. Alternately, the same end could be mounted on a vehicle or other towing device to move the vessel.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. The combination of a vessel and transporter for the vessel comprising:
    a vessel to be transported having two sides,
    said vessel having a gunwale on each side,
    means for securing said vessel to a transporter,
    said transporter comprising:
       a first frame member,
       a second frame member pivotally joined to said first frame member,
       said second frame member and said first frame member being substantially in the same plane,
       said first frame member and said second frame member each having a gunwale engaging portion integrally formed at an upper end thereof,
       each of said gunwale engaging portions being U-shaped for receiving upper edge portions of respective gunwales,
       said gunwale engaging portions of said first and second frame members extending to opposite sides of the gunwales,
       said gunwale engaging portions acting to limit the distance the first frame member may spread apart relative to the second frame member,
       said first frame member, said second frame member and said gunwale engaging portions being the only means for holding said vessel to the transporter, and
       rolling members fixed to an end of said first frame member and to an end of said second frame member,
       said rolling members engaging the surface over which the vessel is to be transported.

2. The combination as claimed in claim 1, wherein the first frame member and
    the second frame member each having telescoping sections, each of said telescoping sections having a sleeve made of a soft material, said sleeves being positioned over the length of the telescoping sections, and
    length adjustment means for the telescoping sections to adjust the lengths of the telescoping sections.

* * * * *